3,328,328
WATER-INSOLUBILIZED FLOOR WAX COMPOSITION CONTAINING ALKALI METAL ALUMINATE AND METHOD FOR PREPARING SAME
Clyde Stephen Scanley, Stamford, Conn., assignor to American Cyanamid Company, Stamford, Conn., a corporation of Maine
No Drawing. Filed July 9, 1964, Ser. No. 381,539
17 Claims. (Cl. 260—28.5)

The present invention relates to novel water-insolubilized floor wax compositions and to a method for preparing the same. More particularly, it relates to improved aluminum salt-containing floor wax compositions which are highly resistant to water spotting.

As is known, numerous floor waxes that contain detergents and acid components are adversely affected by either the inadvertent or unavoidable application of water to a film surface prepared from such waxes. Spotting occurs rapidly and requires frequent reapplications of wax to maintain the surface. Such frequent reapplications are obviously undesirable and efforts have been made to substantially reduce the number of reapplications required to maintain a surface in satisfactory condition when exposed to moisture.

It has been unexpectedly found that frequent reapplications can be virtually eliminated due to the fact that floor waxes, either in solid or liquid form, can be made resistant to water spotting in a straightforward and simple manner. A sufficient amount of ammonia or other volatile amine is added to a floor wax so as to increase its pH to between about 8 and 12. To the resultant alkaline mixture is then added a soluble aluminate compound. On application of the so-modified floor wax composition to a surface, a wax coating which is highly resistant to water spotting is obtained.

In general, any wax in the form of either a solid or liquid may be employed. However, a liquid wax of the anionic type containing acidic groups is preferred since ready reaction sites in the wax are available when the components in the wax mixture are caused to recombine. Illustrative waxes include, for instance, shellac and styrene-ethyl acrylate copolymer emulsions, which are commercially available.

It has been found that the incorporation of a volatile nitrogen component is critical herein so as to increase the alkalinity of the wax composition. The increase in pH creates an environment conducive to aluminate solubilization. As the volatile nitrogen compound, ammonia is preferably added to the wax composition to provide the proper environment. In lieu of ammonia, other illustrative volatile nitrogen compounds which can be added are: the lower alkanolamines, such as the mono-, di-, or triethanolamines, as well as the lower alkylamines, such as methylamine, ethylamine or propylamine.

The maintenance of a high pH level, say between 8 and 12, is of prime import so as to solubilize the added alkali metal aluminate incorporated into the floor wax. Upon exposure of the composition to the atmosphere, evaporation of the volatile nitrogen compound occurs. This apparently causes the alkali metal aluminate to be converted to aluminum ion due to the drop in pH. Reaction between the aluminum ion and the anionic substituent present in solution takes place. Further, aluminum ion reacts with any detergent normally present in floor waxes thereby providing a substantially hydrophobic material substantially unaffected by moisture.

Exemplary of the alkali metal aluminates employed herein are: sodium aluminate, potassium aluminate, lithium aluminate and ammonium aluminate. In general, from about 0.005% to about 10% of a soluble aluminate compound, based on the weight of the wax composition to be treated, can be used.

Illustrative examples presented below are preferred embodiments of the invention. These are not to be taken as being limitative thereof. The parts given are by weight, unless otherwise noted.

To illustrate the efficacy of the compositions of the present invention, the compositions are subjected to the following stringent test in each of the examples herein.

Two coats of the wax composition are flowed on a clear, dark-colored linoleum panel of floor covering mounted with a rigid back. This is allowed to drain and dry in a nearly vertical position for 24 hours at room temperature (23° C.±1.1° C.) and at a controlled relative humidity of 50% between coats. After the addition of a second coat, 1 cc. of distilled water is placed on the panel and allowed to stand undisturbed for one hour. The water is wiped off lightly with a soft, dry cloth. The panel is then lightly buffed and examined visually. Whiteness, if any, indicates water spotting.

*Example 1*

An aqueous ammonium shellac composition is prepared by adding to a suitable reaction vessel while agitating 35 parts of water and 6.6 parts of dried orange shellac. To the mixture is then added 5 parts of concentrated ammonia (30%). The pH of the resultant solution is 10.4.

To 10 parts (by volume) of the latter ammonium shellac solution are added one part of sodium aluminate and 2 parts of ammonia. Resultant composition containing dissolved sodium aluminate is found to have a pH equal to 10.7.

To a second equal aliquot portion 10 parts (by volume) of the ammonium shellac composition is added one part of sodium aluminate, one tenth part of ammonium chloride and 2 parts of concentrated ammonia. The pH of the resultant solution is 10.4.

Each of the prepared ammonium shellac compositions is treated in the manner described above. No spotting is observed where the aluminate-modified composition is employed, whereas water spotting is clearly visible when employing unmodified ammonium shellac compositions. With respect to the further modification involving ammonium chloride addition, no change is observed as compared to the composition omitting ammonium chloride.

*Example 2*

A floor wax of the following composition is prepared and then modified. As prepared, the composition is similar to Johnson's "Glo Coat" brand of floor wax.

| Ingredients: | Percent ingredients |
|---|---|
| Styrene-ethyl acrylate-methyl methacrylate copolymer emulsion (35% polymer) | 10–40 |
| Polyethylene emulsion (10–15% polyethylene) | 10–30 |
| Tricresyl phosphate plasticizer | 0.5–2.0 |
| Styrene-maleic copolymer | 10–20 |
| Water to make a total of 100. | |

The above composition having a pH of 8.7 is modified by adding 15 parts ammonia and one part of sodium aluminate as a 3.1 solution to obtain a pH in the final liquid composition equal to about 10.7.

The unmodified composition is tested in the manner indicated above. It is observed that water spotting occurs.

The aluminate-modified composition is next tested in the same manner with attendant omission of water-spotting.

*Example 3*

In this example a floor wax composition is prepared by polymerizing the following ingredients and then further modifying the same by addition of ammonia thereto. Prior to modification, however, the composition having a pH of 7.2 is analogous to John's "Klear" brand of floor wax composition.

| Ingredients: | Weight in grams for 40% polymer emulsion |
|---|---|
| Styrene | 90 |
| Ethyl acrylate | 17 |
| Methacrylic acid | 3 |
| Ion exchange water (total) | 150.0 |
| Sodium bicarbonate | 0.2 |
| Ammonium persulfate | 0.3 |
| Tetrasodium N - (1,2-dicarboxyethyl)-N-octadecyl sulfosuccinate | 3.0 |

An aliquot of the above composition (100 parts) is modified by adding thereto 14 parts of concentrated ammonia and 7 parts of a 3% sodium aluminate solution to obtain a mixture of pH equal to 10.4.

On testing the above so-prepared wax formulations, it is observed that water spotting occurs where aluminate is not present, and that water spotting is eliminated where the aluminate modification is present.

*Example 4*

A floor wax formulation comprising: 63% water, 30% carnauba and petroleum waxes and 7% of a soluble copolymer as the ammonium salt of ethyl acrylate and acrylic acid is admixed (pH=8.0) and an aliquot thereof is taken. The aliquot is modified by the addition thereto of 6% concentrated ammonia and 10% of 3.13% potassium aluminate solution. The latter formulation having a pH equal to 11 markedly reduces water spotting when tested above, whereas the unmodified wax emulsion is radically affected by water, resulting in spotting of the panels.

The compositions of the present invention prior to exposure contain a volatile nitrogen compound. As such, proper precautions should be taken to avoid evaporation of the nitrogen compound. In the eevnt there is inadvertent exposure prior to use, additional nitrogen additives should be added to increase the pH of the modified floor wax so as to insure the solubilization of the aluminate present therein. In each of the examples above either methylamine or monoethanolamine has been employed in lieu of ammonia with attendant similar results with respect to non-water spotting.

I claim:
1. A method for modifying an anionic floor wax composition which comprises: admixing an anionic floor wax with a volatile nitrogen compound selected from the group consisting of ammonia, lower alkyl amines and lower alkanol amines to increase the pH of said floor wax to between about 8 and about 12, and adding thereto from about 0.005% to about 10% of an alkali metal aluminate compound based on the weight of the floor wax composition, whereby said so-prepared composition is resistant to water spotting.

2. A method according to claim 1 in which the alkali metal aluminate is sodium aluminate.

3. A method according to claim 1 in which the alkali metal aluminate is potassium aluminate.

4. A method according to claim 1 in which the anionic floor wax comprises an aqueous ammonium shellac.

5. A method according to claim 1 in which the aqueous anionic floor wax comprises:
(a) 10%–40% of a 35% styrene-ethyl acrylate-methyl methacrylate copolymer emulsion
(b) 10–30% of a 10%–15% polyethylene emulsion
(c) 0.5%–2.0% tricresyl phosphate plasticizer
(d) 10%–20% styrene-maleic copolymer, and
(e) the remainder water.

6. A liquid floor wax composition adapted for use on surfaces exposed to moisture comprising in combination: a liquid anionic floor wax, a volatile nitrogen additive selected from the group consisting of ammonia, lower alkyl amines and lower alkanol amines and from about 0.005% to about 10% of an alkali metal aluminate based on the overall weight of the wax composition, said nitrogen additive being sufficient to maintain the pH of the overall composition between about 8 and about 12.

7. The composition of claim 6 wherein the alkali metal aluminate is sodium aluminate.

8. The composition of claim 6 wherein the alkali metal aluminate is potassium aluminate.

9. The composition of claim 6 wherein the anionic floor wax comprises an aqueous ammonium shellac.

10. The composition of claim 6 wherein the floor wax composition comprises:
(a) 10%–40% of a 35% styrene-ethyl acrylate-methyl methacrylate copolymer emulsion
(b) 10–30% of a 10%–15% polyethylene emulsion
(c) 0.5%–2.0% tricresyl phosphate plasticizer
(d) 10%–20% styrene-maleic copolymer, and
(e) the remainder water.

11. The composition of claim 6 wherein the nitrogen additive is ammonia.

12. The composition of claim 6 wherein the nitrogen additive is methylamine.

13. The composition of claim 6 wherein the nitrogen additive is monoethanolamine.

14. A method for modifying a liquid anionic floor wax composition which comprises the steps of: admixing said liquid anionic floor wax selected from the group consisting of aqueous ammonium shellac, aqueous styrene-ethyl acrylate copolymer emulsions and aqueous carnauba and petroleum waxes-ethyl acrylate copolymer emulsions with a volatile nitrogen compound selected from the group consisting of ammonia, lower alkyl amines and lower alkanol amines to increase the pH of said floor wax to between about 8 and about 12, and adding thereto from about 0.005% to about 10% of an alkali metal aluminate compound, based on the weight of said floor wax composition, whereby a floor wax composition resistant to water spotting is obtained.

15. A method according to claim 14 in which the alkali metal aluminate is sodium aluminate.

16. A method according to claim 14 in which the alkali metal aluminate is potassium aluminate.

17. A liquid floor wax composition adapted for use on surfaces exposed to moisture comprising in combination: (a) a liquid anionic floor wax selected from the group consisting of aqueous ammonium shellac, an aqueous styrene-ethyl acrylate copolymer emulsion and an aqueous carnauba and petroleum wax-ethyl acrylate copolymer emulsion; (b) a volatile nitrogen additive selected from the group consisting of ammonia, lower alkyl amines and lower alkanol amines; and (c) from about 0.005% to about 10% of an alkali metal aluminate based on the overall weight of the wax composition, said nitrogen additive being sufficient to maintain the pH of the overall composition between about 8 and about 12.

References Cited

UNITED STATES PATENTS

| 2,733,224 | 1/1956 | Smith et al. | 260—28.5 |
| 3,081,190 | 3/1963 | Johnson | 252—8.6 |
| 3,234,158 | 2/1966 | Pfluger et al. | 260—29.6 |

MURRAY TILLMAN, *Primary Examiner.*

W. J. BRIGGS, *Assistant Examiner.*